(12) United States Patent
Kajimura

(10) Patent No.: US 12,737,965 B2
(45) Date of Patent: Sep. 15, 2026

(54) INFORMATION PROCESSING APPARATUS, INFORMATION PROCESSING METHOD, AND NON-TRANSITORY COMPUTER-READABLE MEDIUM FOR CONTROLLING DISPLAY OF DIGITAL CONTENT IN VIRTUAL VIEWPOINT IMAGES

(71) Applicant: CANON KABUSHIKI KAISHA, Tokyo (JP)

(72) Inventor: Fumihiro Kajimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 18/610,308

(22) Filed: Mar. 20, 2024

(65) Prior Publication Data

US 2024/0331271 A1 Oct. 3, 2024

(30) Foreign Application Priority Data

Mar. 28, 2023 (JP) ................................ 2023-051990

(51) Int. Cl.
*G06T 15/20* (2011.01)
*H04N 21/218* (2011.01)
*H04N 21/431* (2011.01)
*H04N 21/4627* (2011.01)

(52) U.S. Cl.
CPC ....... *G06T 15/20* (2013.01); *H04N 21/21805* (2013.01); *H04N 21/4318* (2013.01); *H04N 21/4627* (2013.01)

(58) Field of Classification Search
None
See application file for complete search history.

(56) References Cited

U.S. PATENT DOCUMENTS 5,233,513 A * 8/1993 Doyle ...................... G06F 8/30 705/7.11
9,818,224 B1 * 11/2017 Worley ................ G06T 19/006
2006/0161604 A1 * 7/2006 Lobo ...................... G06F 16/10 707/999.203

(Continued)

FOREIGN PATENT DOCUMENTS

JP 2015-045920 A 3/2015

OTHER PUBLICATIONS

Extended European Search Report issued by the European Patent Office on Jun. 19, 2024 in corresponding EP Patent Application No. 24164102.6.

(Continued)

*Primary Examiner* — Jason A Pringle-Parker
(74) *Attorney, Agent, or Firm* — Carter, DeLuca & Farrell LLP

(57) ABSTRACT

An information processing apparatus is provided. The apparatus obtains content data of a first digital content related to a first object to which a user has a right, and content data of a second digital content related to a second object to which the user does not have a right. The apparatus verifies whether the user has rights to the first digital content and the second digital content. The apparatus generates a virtual viewpoint image showing the first object and the second object. A display mode of the first object differs from a display mode of the second object.

13 Claims, 10 Drawing Sheets

(56) References Cited

U.S. PATENT DOCUMENTS

| | | | | |
|---|---|---|---|---|
| 2009/0217352 | A1* | 8/2009 | Shen | G06F 21/6218 707/999.1 |
| 2011/0066860 | A1* | 3/2011 | Dettinger | H04L 67/131 713/176 |
| 2011/0083086 | A1* | 4/2011 | Brownlow | A63F 13/79 715/753 |
| 2013/0120369 | A1* | 5/2013 | Miller | G06T 19/20 345/419 |
| 2014/0125649 | A1* | 5/2014 | Carlin | G06Q 30/0241 345/419 |
| 2017/0372284 | A1* | 12/2017 | Levy | G06Q 20/1235 |
| 2018/0059631 | A1* | 3/2018 | Newell | B33Y 30/00 |
| 2018/0165426 | A1* | 6/2018 | Nadarajah | G06F 21/10 |
| 2018/0275996 | A1* | 9/2018 | Seaman | G06F 8/61 |
| 2019/0347866 | A1* | 11/2019 | Gonzalez Aguirre | G06T 19/006 |
| 2021/0366183 | A1* | 11/2021 | Gisslén | G06N 3/045 |
| 2022/0327225 | A1* | 10/2022 | Lyren | G06F 21/125 |
| 2022/0351280 | A1* | 11/2022 | Cardenas Gasca | G06Q 30/0643 |
| 2023/0351680 | A1* | 11/2023 | Helfgott | H04L 9/50 |

OTHER PUBLICATIONS

Fowler, A. et al., "Tokenfication—The Potential of non-fungible tokens (NFT) for game development" Proceedings of the Genetic and Evolutionary Computation Conference (Oct. 2021) pp. 152-157.

Nadini, M. et al., "Mapping the NFT Revolution: Market Trends, Trade Networks, and Visual Features" Scientific Reports (Oct. 2021) pp. 1-11.

Bridgeman, L. et al., "Multi-Person 3D Pose Estimation and Tracking in Sports" CVPR Workshop (Jun. 2019) pp. 2487-2496.

Smosh Games, "Dead or Alive 5 First Impressions (Dope! or Nope)" XP093167062 (Oct. 2012) pp. 1-2, retrieved from the Internet: https://www.youtube.com/watch?v=Bz1-Od_Zwyg?t=49s.

Anonymous, "The Conclusion of the Mass Effect Triology" XP093155661 (Mar. 2012) pp. 1-11, retrieved from the Internet: https://www.giantbomb.com/mass-effect-3/3030-29935/user-reviews/2200-22350/.

* cited by examiner

SHOOTING SYSTEM
5
GENERATION SYSTEM
6
DATABASE SYSTEM
1
BLOCKCHAIN SYSTEM
2
PROVISION SYSTEM
3
DISTRIBUTION UNIT
34
DATA OBTAINMENT UNIT
33
REQUEST RECEPTION UNIT
31
REGISTRATION UNIT
32
USER MANAGEMENT UNIT
30
DISPLAY SYSTEM
4
CONTENT OBTAINMENT UNIT
42
SCREEN DISPLAY UNIT
40
RENDERING UNIT
45
CONTROL UNIT
44
REQUEST TRANSMISSION UNIT
41
USER INFORMATION OBTAINMENT UNIT
43

F I G. 2
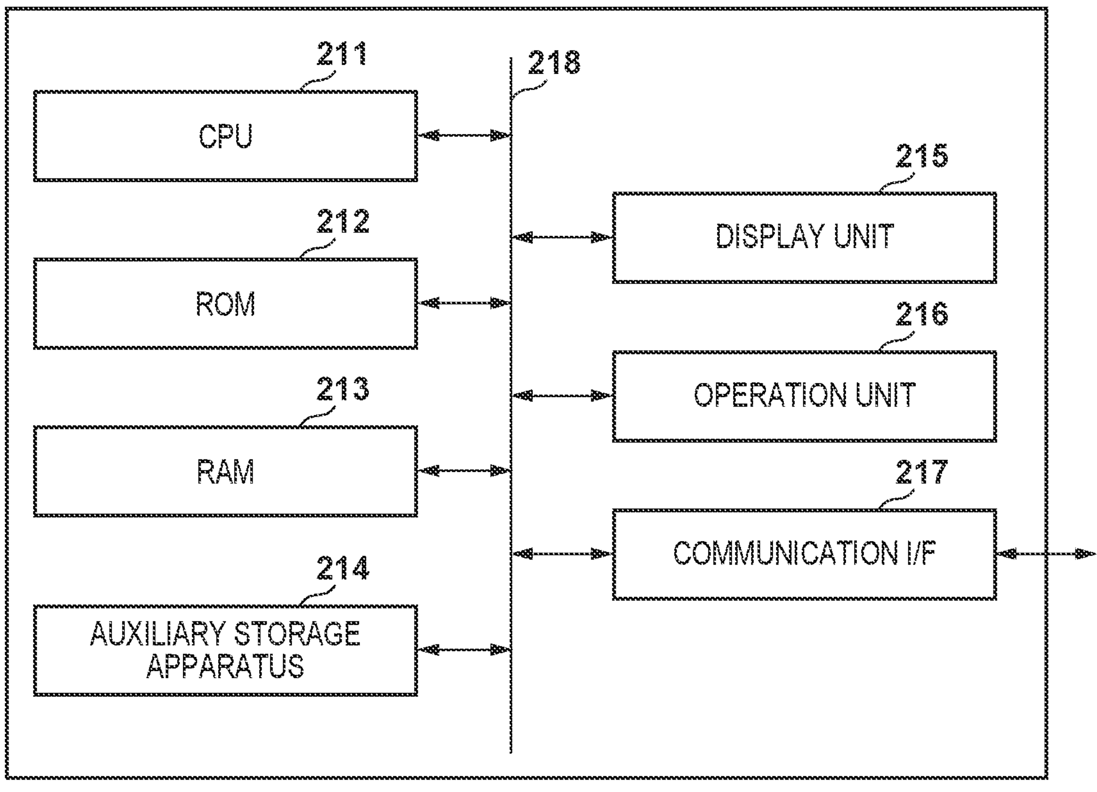
F I G. 3
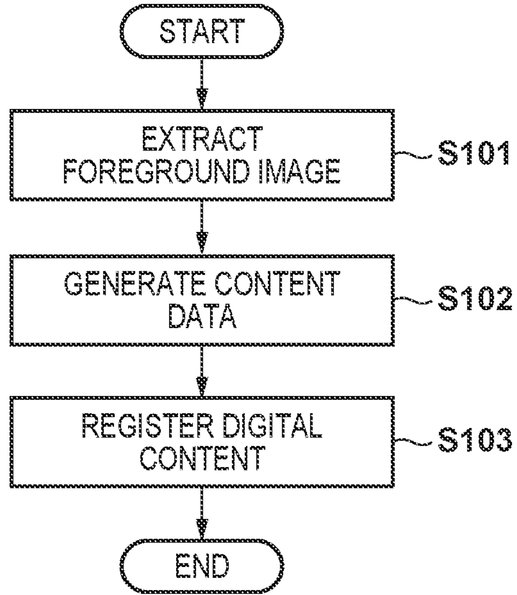

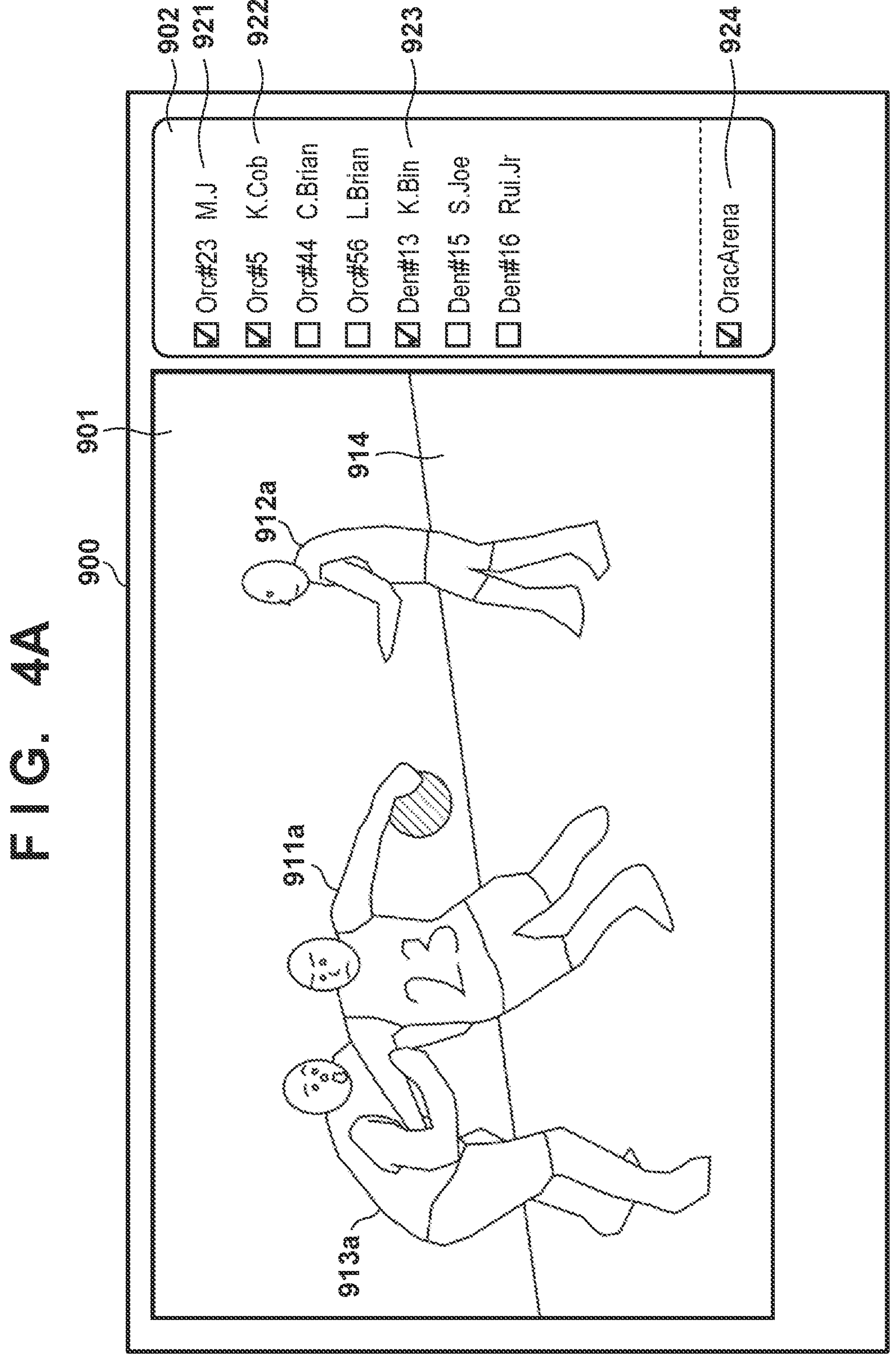
F I G. 4A

FIG. 4B 900
901
902
921
922b
923b
911a
Orc#23 M.J
Orc#5 K.Cob
Orc#44 C.Brian
Orc#56 L.Brian
Den#13 K.Bin
Den#15 S.Joe
Den#16 Rui.Jr
OracArena
23

FIG. 6A

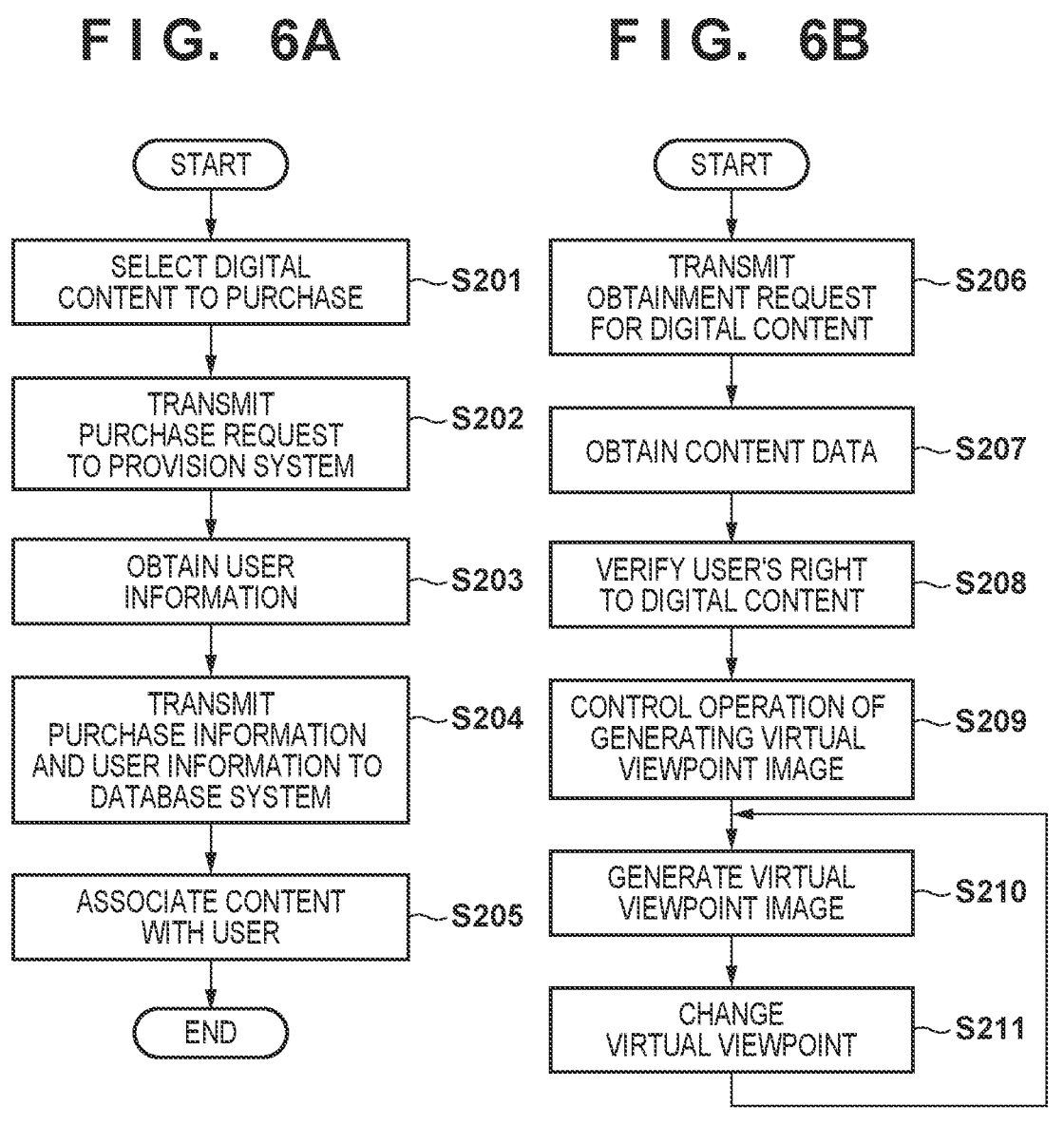

START
SELECT DIGITAL CONTENT TO PURCHASE — S201
TRANSMIT PURCHASE REQUEST TO PROVISION SYSTEM — S202
OBTAIN USER INFORMATION — S203
TRANSMIT PURCHASE INFORMATION AND USER INFORMATION TO DATABASE SYSTEM — S204
ASSOCIATE CONTENT WITH USER — S205
END

FIG. 6B

START
TRANSMIT OBTAINMENT REQUEST FOR DIGITAL CONTENT — S206
OBTAIN CONTENT DATA — S207
VERIFY USER'S RIGHT TO DIGITAL CONTENT — S208
CONTROL OPERATION OF GENERATING VIRTUAL VIEWPOINT IMAGE — S209
GENERATE VIRTUAL VIEWPOINT IMAGE — S210
CHANGE VIRTUAL VIEWPOINT — S211

Game name1

● Team ORC BAKERS

| | Num | Name | NFT | Price |
|---|---|---|---|---|
| ☐ | #23 | M.J | 5/100 | $200 |
| ☐ | #5 | K.Cob | 45/100 | $100 |
| ☐ | #44 | C.Brian | 20/100 | $150 |

⋮

● Team DEN SPIDERS

| | Num | Name | NFT | Price |
|---|---|---|---|---|
| ☐ | #13 | K.Bin | 50/100 | $100 |
| ☐ | #15 | S.Joe | 80/100 | $100 |
| ☐ | #16 | Rui.Jr | 80/100 | $100 |

⋮

● Arena

| | Name | NFT | Price |
|---|---|---|---|
| ☐ | OracArena | 500/1000 | $50 |

INFORMATION PROCESSING APPARATUS, INFORMATION PROCESSING METHOD, AND NON-TRANSITORY COMPUTER-READABLE MEDIUM FOR CONTROLLING DISPLAY OF DIGITAL CONTENT IN VIRTUAL VIEWPOINT IMAGES

BACKGROUND

Field

The present disclosure relates to an information processing apparatus, an information processing method, and a non-transitory computer-readable medium, and in particular to a technique to display a virtual viewpoint image.

Description of the Related Art

Attention has been paid to a technique that generates a virtual viewpoint image from a designated virtual viewpoint using a plurality of images obtained by a multi-viewpoint camera. Japanese Patent Laid-Open No. 2015-45920 describes a method of generating such a virtual viewpoint image. According to the method of Japanese Patent Laid-Open No. 2015-45920, a plurality of cameras are installed at different positions. Furthermore, a subject is captured using the plurality of cameras. Then, a three-dimensional shape of the subject is estimated from the captured images. A virtual viewpoint image is generated by using a three-dimensional shape model of the subject that has been obtained in the foregoing manner.

Meanwhile, a digital item is a target of sales and purchase. Here, it is required to set a right (e.g., ownership) to digital content. In view of this, a blockchain technology that certifies a right to digital content has been drawing attention. For example, a non-fungible token (NFT) is added to digital content such as a digital item and a digital artwork inside a virtual space or a computer game.

SUMMARY

According to an embodiment, an information processing apparatus comprises one or more memories storing instructions and one or more processors that execute the instructions to: obtain content data of a first digital content related to a first object to which a user has a right, and content data of a second digital content related to a second object to which the user does not have a right; verify whether the user has rights to the first digital content and the second digital content; and generate a virtual viewpoint image showing the first object and the second object, wherein a display mode of the first object differs from a display mode of the second object.

According to another embodiment, an information processing apparatus comprises one or more memories storing instructions and one or more processors that execute the instructions to: verify whether a user has a right to digital content; transmit content data of the digital content to an image processing apparatus that generates a virtual viewpoint image; and transmit information indicating a display mode of an object corresponding to the digital content to the image processing apparatus in accordance with whether the user has a right to the digital content.

According to still another embodiment, an information processing method comprises: obtaining content data of a first digital content related to a first object to which a user has a right, and content data of a second digital content related to a second object to which the user does not have a right; verifying whether the user has rights to the first digital content and the second digital content; and generating a virtual viewpoint image showing the first object and the second object, wherein a display mode of the first object differs from a display mode of the second object.

According to yet another embodiment, an information processing method comprises: verifying whether a user has a right to digital content; transmitting content data of the digital content to an image processing apparatus that generates a virtual viewpoint image; and transmitting information indicating a display mode of an object corresponding to the digital content to the image processing apparatus in accordance with whether the user has a right to the digital content.

According to still yet another embodiment, a non-transitory computer-readable medium stores a program executable by a computer to perform a method comprising: obtaining content data of a first digital content related to a first object to which a user has a right, and content data of a second digital content related to a second object to which the user does not have a right; verifying whether the user has rights to the first digital content and the second digital content; and generating a virtual viewpoint image showing the first object and the second object, wherein a display mode of the first object differs from a display mode of the second object.

Further features of the present disclosure will become apparent from the following description of exemplary embodiments (with reference to the attached drawings).

BRIEF DESCRIPTION OF THE DRAWINGS

FIG. 2 is a diagram showing an exemplary hardware configuration of a system according to an embodiment.

FIG. 3 is a flowchart of processing for registering digital content according to an embodiment.

FIGS. 4A to 4C are schematic diagrams showing examples of a digital content display screen.

FIGS. 6A and 6B are flowcharts of processing for displaying digital contents according to an embodiment.

DESCRIPTION OF THE EMBODIMENTS

Figure 1:
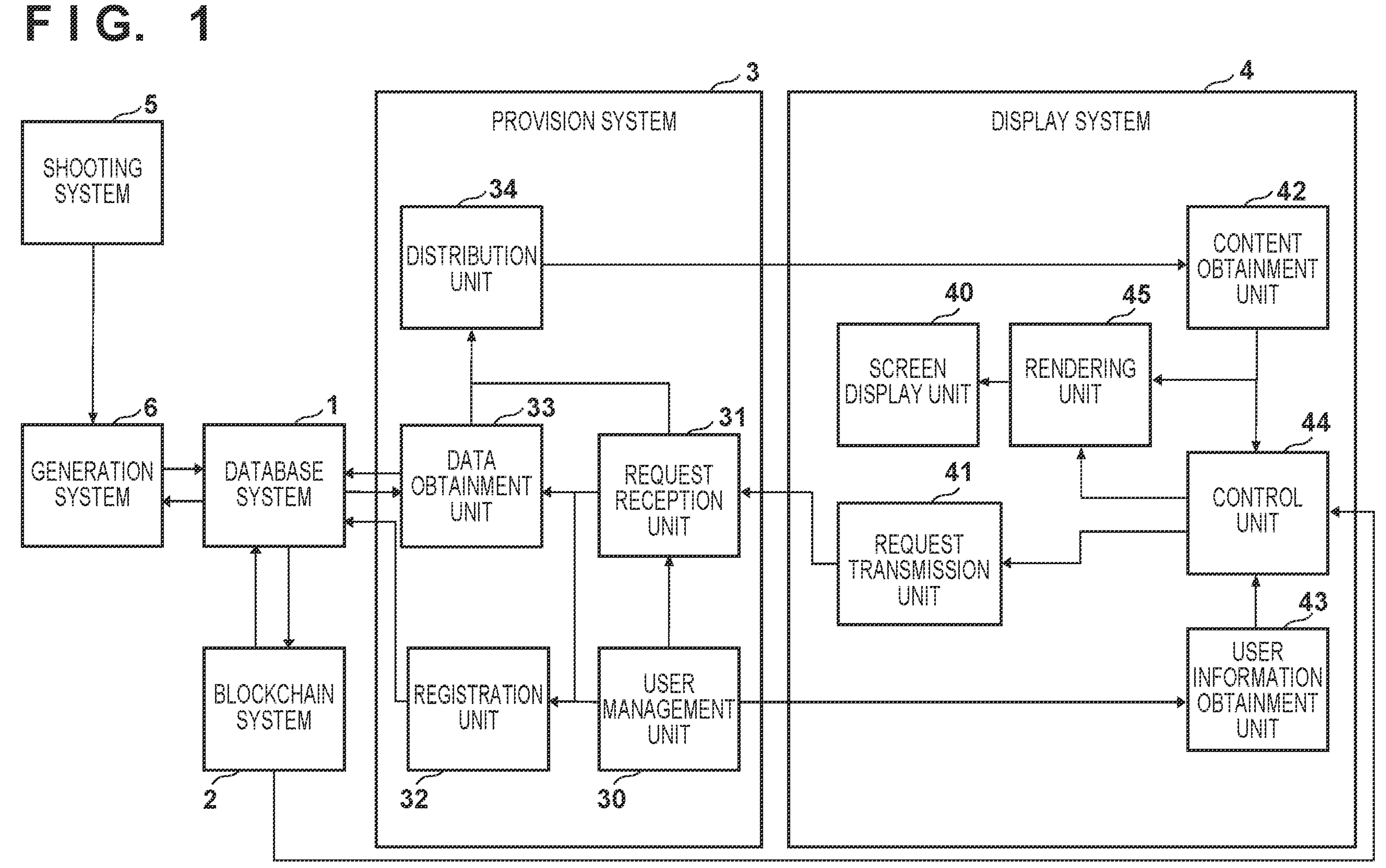
FIG. 1 is a diagram showing an exemplary configuration of an image processing system according to an embodiment.

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

The inventor(s) of the present application has considered that setting a right to digital content under a virtual viewpoint image technique enables the promotion of the use of the digital content while protecting the rights of a digital content creator. For example, a user can obtain a right to digital content that is used to generate a virtual viewpoint image. This digital content is, for example, an object that can be displayed in a virtual viewpoint image. At this time, the user can obtain a virtual viewpoint image based on content data of the digital content to which the user has a right. This content data can be, for example, data indicating a three-dimensional shape of the object corresponding to the digital content.

Meanwhile, protecting content data in the foregoing manner may prevent the user from enjoying contents. For example, the use of content data may be restricted also when the user selects digital content that the user wishes to purchase. In this case, it is difficult for the user to judge which digital content is to be selected when obtaining a right to content data. Also, it is possible to generate a virtual viewpoint image using digital contents that respectively correspond to a plurality of objects. In this case, the plurality of objects may respectively correspond to, for example, different players in a sport match. At this time, a virtual viewpoint image that is based only on content data corresponding to a specific player may be generated. However, in this case, as objects corresponding to other players are not included in the virtual viewpoint image, it may be difficult to grasp what the specific player is doing.

An embodiment of the present disclosure enables a user to enjoy digital contents to a greater extent under a technique that generates a virtual viewpoint image.

An embodiment of the present disclosure relates to a system that generates a virtual viewpoint image. In the present embodiment, the virtual viewpoint image is generated based on content data of digital content. Then, a right to the digital content is assigned to a user. Note that in the present specification, the user's obtainment of a right to digital content may be referred to as "purchase of digital content". Also, a right to display the digital content obtained by the user may be referred to as "ownership" of the digital content. Furthermore, the user's possession of the right to the digital content may be referred to as "own the digital content".

The following describes a case where granting of a right to digital content to a user is realized using a non-fungible token. That is to say, a non-fungible token is added to digital content. A non-fungible token (hereinafter, NFT) is one of tokens that are issued and distributed on a blockchain. By making use of an NFT, a unique value can be added to digital content. The NFT standards are defined by, for example, ERC-721 or ERC-1155. In the present embodiment, a user can obtain a right to digital content to which an NFT has been added by obtaining this NFT.

In the present embodiment, display processing for digital content is controlled based on owner information and user information. Here, the owner information indicates a user who owns the digital content. Also, the user information indicates a user who is using the system. In the present embodiment, digital content is related to an object. Also, content data of digital content that is used to generate a virtual viewpoint image indicates information of an object to be displayed. Such digital content can be referred to as a virtual viewpoint content.

In an embodiment, content data of digital content includes appearance information of an object and position information of the object. The position information of the object can indicate the position of the object in a virtual space. The appearance information of the object can include shape data indicating the shape of the object, and texture data indicating the texture of the object. Digital content may indicate an object that acts as a subject (also referred to as a foreground object), like a person. On the other hand, digital content may indicate a background object. Content data of digital content related to such a background object can include a background shape model and background texture data. Content data related to such a background object can indicate information related to a virtual space in which an object exists in a virtual world.

In an embodiment described below, a virtual viewpoint video based on digital content can be generated. For example, appearance information of an object may indicate the appearance of the object that changes with time. Also, position information of an object may indicate the position of the object that changes with time. Based on these pieces of information, virtual viewpoint images at respective times can be generated. The virtual viewpoint video includes the virtual viewpoint images in time series that have been generated in this way. As described above, a virtual viewpoint video including virtual viewpoint images that exhibit changes with time can be generated in the embodiment described below.

Content data can be generated using existing CG tools. On the other hand, content data may be generated based on captured images. Furthermore, content data may be generated based on the shape of an object in the real world. For example, content data for a building can be generated using the shape of the building based on a three-dimensional shape measuring device. The format of such content data is not limited in particular.

The type of shape data, too, is not limited in particular. For example, shape data may be a mesh model that is represented using the elements of triangles or quadrilaterals. Such shape data is indicated by the coordinates of vertices of each element. Furthermore, shape data may be data that is used to estimate a three-dimensional shape of an object. For example, shape data may be a group of foreground images that have been extracted respectively from a plurality of captured images obtained by capturing a subject corresponding to an object from a plurality of directions. Shape data can be represented in a file format such as FBX.

Texture data can be a texture image indicating a texture of an object. Texture data may be an image appended to a model based on shape data (e.g., a mesh model). Texture data is appended to a mesh model based on a correspondence relationship between the vertices of each element of shape data and the coordinates in an image. Texture data can be represented in an image format such as BMP and PNG.

System Configuration

The following describes an image processing system according to the present embodiment with reference to the drawings. The image processing system according to the present embodiment can generate a virtual viewpoint image. FIG. 1 is a block diagram showing an exemplary configuration of the image processing system according to the present embodiment, and an exemplary functional configuration of each system included in the image processing system. The image processing system includes a database system 1, a blockchain system 2, a provision system 3, a display system 4, a capturing system 5, and a generation system 6.

The database system 1 stores and manages content data of digital content. For example, the database system 1 can store content data related to a subject. In the following example, content data related to a subject includes shape data indicating a shape model of the subject, texture data indicating an image appended to the shape model, position data of the shape model, and metadata indicating metainformation related to the subject. Furthermore, the database system 1 stores content data related to a background. Content data related to a background includes shape data indicating a shape model of the background, and texture data indicating an image appended to the shape model.

The blockchain system 2 is used to guarantee a user's right to digital content. In the present embodiment, the number of rights to digital content can be restricted in order to increase the asset value of the content. For example, the blockchain system 2 registers a new digital content with a blockchain in accordance with a request from the database system 1. At this time, the blockchain system 2 can issue NFTs that are equivalent in number to a number set by a content creator with respect to this content. For example, in a case where 500 NFTs have been issued, up to 500 people can own this content. A user can obtain ownership of the digital content by purchasing the issued NFT. In the present embodiment, a user who has ownership of the digital content can display this digital content using an image display apparatus.

Note that a method of guaranteeing a user's right to digital content is not limited to the method that uses the blockchain technology. For example, in the database system 1, users who have a right to digital content may be managed. Furthermore, the rarity of digital contents can also be increased by restricting the number of digital contents and managing the digital contents using serial numbers.

In order to generate a virtual viewpoint image, the provision system 3 obtains content data from the database system 1 and transmits the same to the display system 4. Also, the provision system 3 can register a generated digital content with the database system 1.

The provision system 3 includes a user management unit 30, a request reception unit 31, a registration unit 32, a data obtainment unit 33, and a distribution unit 34. The user management unit 30 manages information of a user who uses the image processing system. For example, the user management unit 30 can newly register, edit, or delete a user's account. Examples of the information managed by the user management unit 30 include a user ID, a user's name, a user's role, financial account information used in sales and purchase of content, and so forth.

Examples of the user's role include a seller, a viewer, and a distributor. A seller generates and sells digital content. For example, a seller can register digital content with the database system 1 for the purpose of sales through processing according to a flowchart of FIG. 6A, which will be described later. A viewer can watch a virtual viewpoint image based on digital content. For example, a viewer can watch a virtual viewpoint image through processing according to a flowchart of FIG. 6B, which will be described later. A distributor distributes a virtual viewpoint image based on digital content. Although no detailed description is provided in the present specification, a distributor can distribute a virtual viewpoint image generated through processing according to the flowchart of FIG. 6B to another user.

The request reception unit 31 obtains a request transmitted from the provision system 3. Then, in accordance with the request, the request reception unit 31 allocates the request to the registration unit 32 or the data obtainment unit 33. For example, a content registration request for registering generated content data with the system is transmitted to the registration unit 32. Once the registration unit 32 has received the content registration request, the registration unit 32 transmits the content data to the database system 1.

Also, in a case where a viewer is to purchase digital content, the request reception unit 31 receives a purchase request. Then, the request reception unit 31 transmits a content purchase request to the data obtainment unit 33. Once the data obtainment unit 33 has obtained the content purchase request, the data obtainment unit 33 transmits purchase information indicating the content to be purchased and user information to the database system 1 so that processing for purchase of the content by the user is executed. Furthermore, in a case where digital content is to be displayed, the request reception unit 31 receives an obtainment request. Then, the request reception unit 31 transmits a content obtainment request to the data obtainment unit 33. The data obtainment unit 33 obtains content data from the database system 1, and transmits the same to the distribution unit 34. The distribution unit 34 distributes the data obtained by the data obtainment unit 33 to a viewer.

The display system 4, which is an image processing apparatus or an information processing apparatus according to an embodiment, generates a virtual viewpoint image based on content data. Also, the display system 4 can provide a user with an environment for viewing of the virtual viewpoint image. The display system 4 can perform display control with respect to digital content included in the virtual viewpoint image. This display control can be performed in accordance with owner information and user information of the digital content.

The display system 4 includes a screen display unit 40, a request transmission unit 41, a content obtainment unit 42, a user information obtainment unit 43, a control unit 44, and a rendering unit 45. The screen display unit 40 causes a display apparatus such as a display to display a virtual viewpoint image. The screen display unit 40 may cause the display apparatus to display a display screen for displaying a virtual viewpoint image. Here, the display apparatus may be connected to the display system 4 via a network (e.g., the Internet).

This display screen can include a region for displaying a virtual viewpoint image that includes a result of rendering of digital content. Also, this display screen may include a GUI for selecting a display method for digital content. Furthermore, the screen display unit 40 may cause the display apparatus to display a content selection screen for selecting digital content to be displayed or purchased. The content selection screen may display a list of digital contents that are available for purchase. Examples of the digital contents that are available for purchase include digital content corresponding to a player, and digital content corresponding to a background. Information or a request that has been input by a user on these screens is transmitted by the request transmission unit 41 to the provision system 3. Examples of the request include a request for new registration of a user account, and a request for management of a user account. Furthermore, examples of the request also include a request for new registration of digital content, a request for obtainment thereof, and a request for purchase thereof.

In accordance with the request, the content obtainment unit 42 obtains one or more pieces of content data from the distribution unit 34 of the provision system 3. The user information obtainment unit 43 obtains user information managed by the provision system 3.

The control unit 44 verifies whether a user has a right to digital content. In the present embodiment, the control unit 44 uses a blockchain technology to verify whether a user has a right to digital content. For example, the control unit 44 can verify whether a user has a right by accessing the blockchain system 2. Especially, the control unit 44 can verify whether a user has a right to digital content based on the NFT(s) added to the digital content.

Then, the control unit 44 can control the operations performed by the rendering unit 45 in accordance with the verification result. For example, the control unit 44 can control a GUI for selecting a display method for digital content based on owner information of the digital content and user information obtained by the user information obtainment unit 43. Furthermore, based on a user's selection, the control unit 44 transmits content data to be used in generation of a virtual viewpoint image to the rendering unit 45.

The rendering unit 45 generates a virtual viewpoint image of an object placed in a virtual space based on content data. For example, the rendering unit 45 can generate an image to be displayed on the display apparatus, and transmits the image to the screen display unit 40. The rendering unit 45 can generate the above-described display screen or content selection screen. The rendering unit 45 can generate a virtual viewpoint image by rendering digital content based on data obtained from the control unit 44.

The capturing system 5 includes a plurality of capturing apparatuses. The capturing apparatuses capture a subject from different directions. As such, the capturing system 5 may be a multi-viewpoint camera capturing system that captures a subject using a plurality of cameras. For example, the plurality of capturing apparatus may be installed at different positions so that they surround the subject and face different directions. Note that the capturing apparatuses may not be installed to cover an entire periphery of the subject. For example, they may be installed only in regions that are located in predetermined directions from the subject because of, for example, restrictions on installation positions.

Each capturing apparatus has an identification number for identifying the capturing apparatus. Also, the plurality of capturing apparatuses can operate in synchronization. Capturing time information is added to the images that have been captured respectively by the plurality of capturing apparatuses. In order to allow time information of the real world to be added at the time of capturing, the plurality of capturing apparatuses may be synchronized with one another so that they share common time information of the real world. In the present embodiment, each of the plurality of capturing apparatuses captures a video. Also, each of the plurality of capturing apparatuses can add capturing time information to each of the frame images in time series included in the video.

The capturing system 5 may further include an image processing apparatus. This image processing apparatus can generate a foreground image from the captured images obtained by the capturing apparatuses. The foreground image is an image generated by extracting a subject region (a foreground region) from the captured images. A subject extracted as the foreground region is, for example, a dynamic subject (a movable object) that is mobile (the position and the shape thereof are changeable). An example of the dynamic subject is a person. For example, the dynamic subject may be a player or a referee who is present in a field where a game is played. Another example of the dynamic subject is an object used in a game. For example, the dynamic subject may be a ball used in a ball game. In an embodiment, each capturing apparatus includes such an image processing apparatus. Note that a plurality of capturing apparatuses may be connected to one image processing apparatus.

The image processing apparatus can hold status information such as the positions, orientations (apparatus directions and capturing directions), focal lengths, optical centers, distortions, and f-numbers of the capturing apparatuses. The image processing apparatus may control the positions and the orientations (apparatus directions and capturing directions) of the capturing apparatuses. Hereinafter, status information of a camera is referred to as camera parameters. Camera parameters related to the position and orientation (apparatus direction and capturing direction) of the camera are so-called external parameters. Also, parameters related to the focal length, image center, and distortion of the camera are so-called internal parameters. The position and orientation of the camera can be represented in accordance with one world coordinate system with use of, for example, the origin, Xw-axis, Yw-axis, and Zw-axis of a three-dimensional coordinate space. Also, the coordinate system in an image captured by the camera (hereinafter referred to as an image coordinate system) can be represented with use of the origin, Xi-axis, and Yi-axis for two-dimensional coordinates.

The generation system 6 generates content data of digital content. The generation system 6 can generate appearance information with respect to a subject based on the captured images obtained by the capturing system 5.

For example, the generation system 6 can estimate a three-dimensional shape of the subject. To this end, the generation system 6 obtains, from the image processing apparatus included in the capturing system 5, a foreground image based on the captured images obtained by the respective capturing apparatuses, and camera parameters of each capturing apparatus. The generation system 6 can obtain the camera parameters together with the foreground image. Also, the obtainment of the camera parameters by the generation system 6 may be asynchronous with the foreground image. For example, the generation system 6 may obtain the camera parameters in the stage of preliminary preparation.

Then, the generation system 6 estimates the three-dimensional shape of the subject based on the foreground image and the camera parameters. A shape model, which indicates the three-dimensional shape of the subject, can be obtained using a volume intersection method (shape from silhouette), for example. As a result of this processing, point group information indicating the shape of the subject can be obtained. The coordinates of each point can be represented using, for example, a coordinate system (world coordinate system) that is the same as the coordinate system for the external camera parameters. Furthermore, an obtained point group can be divided into pieces of point group information for respective subjects. For example, a three-dimensional labeling method based on the existence or absence of adjacent points can be used in the division of the point group. Through such processing, a subject ID indicating a labeling result is added to each point. In this way, subject IDs specify pieces of point group information for respective subjects. Furthermore, processing for creating meshes with respect to obtained point group information may be executed. For example, point group information may be represented as a set of triangular patches. In one example, a set of triangular patches is obtained by applying the marching cubes method to obtained point group information. In this way, a three-dimensional shape of a subject can also be represented by a polygon.

Furthermore, the generation system 6 can obtain texture information of a subject. The generation system 6 can obtain such texture information based on three-dimensional shape data of the subject and on the captured images obtained by the capturing system 5. For example, with respect to each of the triangular patches indicating the three-dimensional shape of the subject, a camera that is assumed to be positioned nearest to the front surface of the triangular patch can be selected. Such a camera can be determined based on a normal to the triangular patch and the line-of-sight vector of each camera. The triangular patch is projected onto an image captured by the selected camera. Then, a texture image is extracted from a region corresponding to the projected triangular patch in the captured image. Such a texture image is used as texture information corresponding to the triangular patch.

With use of the foregoing method, appearance information of a subject including shape data of the subject and texture data of the subject can be obtained on a per-subject basis. Note that another method can also be used as a method of estimating the shape and texture of a subject. Furthermore, appearance information of a subject generated by the generation system 6 may include motion information indicating a motion of the subject based on a skeleton model.

In addition, the generation system 6 can also obtain position information of a subject. For example, based on pieces of shape data of respective subjects, the generation system 6 can calculate the barycenters of the subjects. Such position information of a subject can be used to determine a position of an object in a virtual space when the display system 4 generates a virtual viewpoint image.

The generation system 6 can obtain pieces of appearance information and pieces of position information of a subject at respective times by executing the above-described processing based on the foreground images obtained at respective times. Furthermore, the generation system 6 can associate appearance information of a subject at a certain time with appearance information of the same subject at a different time. Such association can be made by referring to the pieces of position information of the subject at respective times. By using such a method, even when a plurality of subjects exist, pieces of appearance information in time series can be obtained for each of the plurality of subjects. Moreover, the generation system 6 can also obtain pieces of position information in time series for each of the plurality of subjects by tracking the barycenters of the subjects in time series.

Hardware Configuration

Each system shown in FIG. 1 can be realized using a computer. Examples of the computer include a server, a desktop computer, a laptop computer, a tablet PC, a smartphone, and the like. Note that each system may be composed of, for example, a plurality of information processing apparatuses connected via a network. For example, the functions of each system may be provided as a cloud service. Meanwhile, the functions of two or more systems may be realized by one information processing apparatus.

An exemplary hardware configuration of each system will be described with reference to FIG. 2. Each system includes a CPU 211, a ROM 212, a RAM 213, an auxiliary storage apparatus 214, a display unit 215, an operation unit 216, a communication I/F 217, and a bus 218. The CPU 211 controls the entirety of the system using a computer program or data stored in the ROM 212 or RAM 213. In the present embodiment, a program which is stored in the ROM 212 and which realizes the functions of each unit is read out to the RAM 213. Then, the CPU 211 operates in accordance with the program in the RAM 213, thereby realizing each function of each system shown in FIG. 1. Note that one or more systems may include one or more dedicated items of hardware different from the CPU 211. In this case, these dedicated items of hardware can realize at least a part of the functions of each system shown in FIG. 1. An example of the dedicated items of hardware is an application-specific integrated circuit (ASIC).

The ROM 212 can store a program that need not be changed. The RAM 213 can temporarily store a program or data. The RAM 213 can store, for example, a program or data supplied from the auxiliary storage apparatus 214, or data supplied from the outside via the communication I/F 217. The auxiliary storage apparatus 214 is, for example, a hard disk drive. The auxiliary storage apparatus 214 stores various types of data such as image data and sound data.

The display unit 215 is a display apparatus such as a liquid crystal display, an LED, and the like. The display unit 215 can display, for example, a graphical user interface (GUI) that is used by a user to operate the system. The operation unit 216 inputs various types of instructions to the CPU 211 in accordance with a user operation. The operation unit 216 may be, for example, a keyboard, a mouse, a joystick, or a touch panel. The CPU 211 can operate as a display control unit that controls the display unit 215, and an operation control unit that controls the operation unit 216. Note, FIG. 2 shows that the display unit 215 and the operation unit 216 are present inside the system. However, at least one of the display unit 215 and the operation unit 216 may be an apparatus which is connected outside the system and which is separate from the system.

The communication I/F 217 is used in communication with an apparatus that is outside the system. For example, in a case where the system is connected to the external apparatus by wire, a cable for communication is connected to the communication I/F 217. Also, in a case where the system has a function to perform wireless communication with the external apparatus, the communication I/F 217 includes an antenna. The bus 218 connects among the aforementioned units, and carries information thereamong.

Operation Flow: Registration of Digital Content

Processing for registering digital content will be described with reference to a flowchart shown in FIG. 3. According to the following processing, content data of digital content is generated based on captured images obtained by the capturing system 5. Also, an NFT(s) is added to the digital content.

In step S101, the capturing system 5 extracts foreground images indicating a subject from the images captured by the respective capturing apparatuses. Then, the capturing system 5 transmits the foreground images obtained from the respective captured images to the generation system 6.

In step S102, based on the foreground images, the generation system 6 generates content data related to an object that acts as a subject as described earlier. Then, the generation system 6 transmits the content data, which includes shape data, texture data, and position information, to the database system 1.

Note that content data related to a background object described earlier is transmitted to the database system 1 separately from the content data related to the object that acts as the subject. Based on the images captured by the capturing system 5, the generation system 6 can generate the content data related to the background object and transmit the same to the database system 1. Such content data may be generated using another method such as a method that uses a CG generation tool or shape measurement, as has already been described. The database system 1 also stores such content data related to the background object.

In step S103, the database system 1 registers the digital contents. The database system 1 can store the transmitted pieces of content data. Also, the database system 1 can store metainformation of the digital contents. Examples of the metainformation include object IDs that identify objects. By using the object IDs, content data related to a specific object (e.g., a player) can be specified. Furthermore, examples of the metainformation also include pieces of attribute information related to objects. For example, a piece of attribute information related to a player of a sport like basketball may include a player's name, a name of a team to which the player belongs, a uniform number of the player, or personal data including a player's height or weight.

In this example, the digital contents registered with the database system 1 are related to a scene. Pieces of content data of digital contents related to one scene include pieces of appearance information in time series and position information within a predetermined time period. For example, digital content related to one scene may indicate a motion of a player within the predetermined time period. In this case, metainformation of the digital content can include time information of the scene, such as a start time and an end time of the scene. No particular limitation is placed on a method of setting a scene. For example, time information of a scene may be automatically determined based on videos obtained from the capturing system 5. Also, time information may be manually set by a content creator who operates the generation system 6 or the database system 1.

Note that one scene may include a plurality of objects (subjects or backgrounds). In this way, one scene may be related to a plurality of digital contents that respectively correspond to different objects. By using the aforementioned object IDs, a plurality of digital contents related to one scene can be identified.

Furthermore, an NFT(s) is added to digital content registered with the database system 1. As described above, NFTs are issued by the blockchain system 2. For example, an NFT(s) can be added to digital content by registering the digital content with the blockchain system 2.

Through the processing shown in FIG. 3, the digital contents with NFTs added thereto are registered with the image processing system. Furthermore, the registered digital contents can be purchased in a mode where ownership can be certified. For example, a user, who is a viewer, can purchase an NFT for digital content registered with the database system 1. For example, the user can purchase an NFT for a player or a background included in a scene on an individual basis.

Display of Digital Contents

Figure 4B:
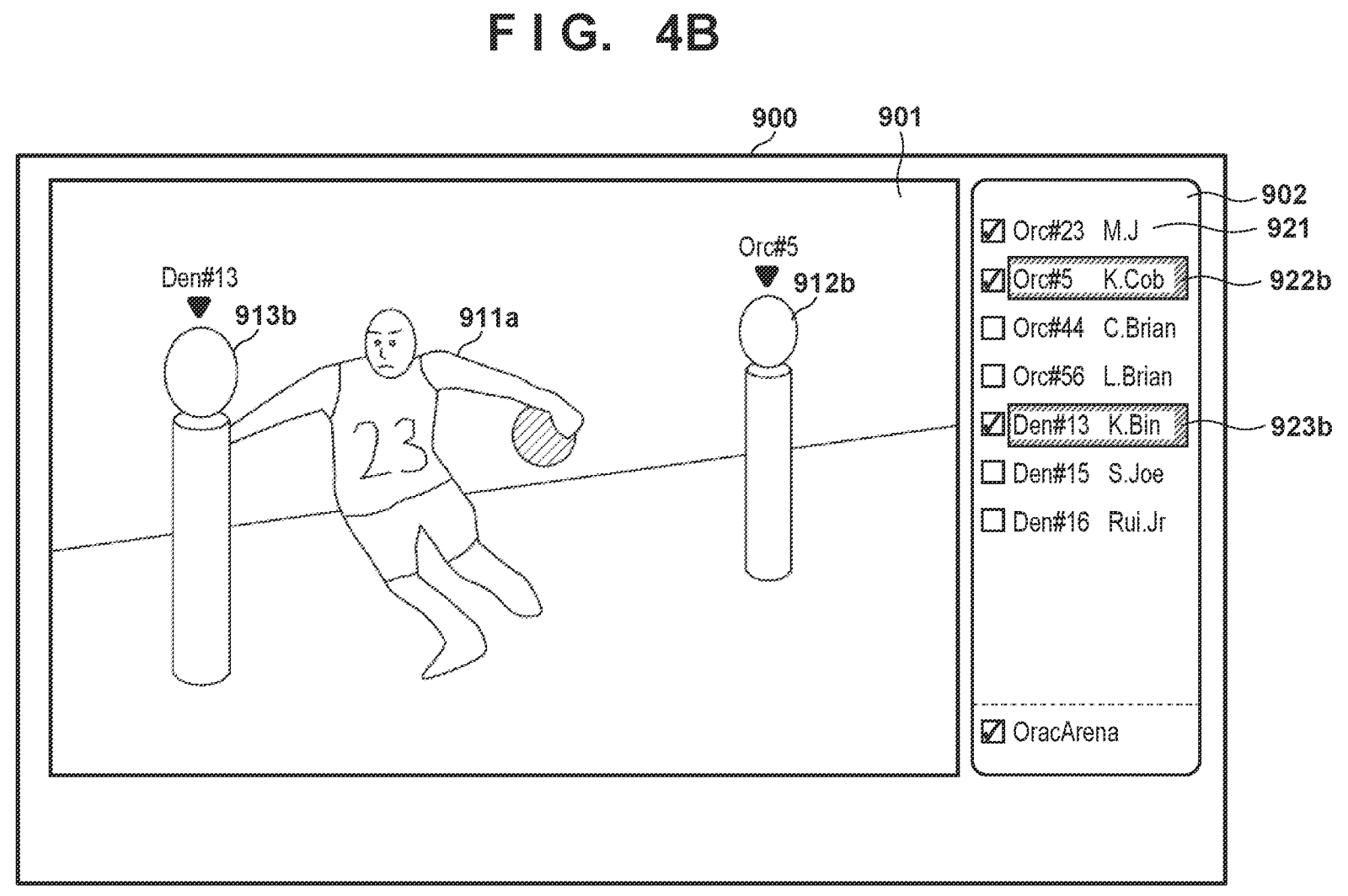
Figure 4C:
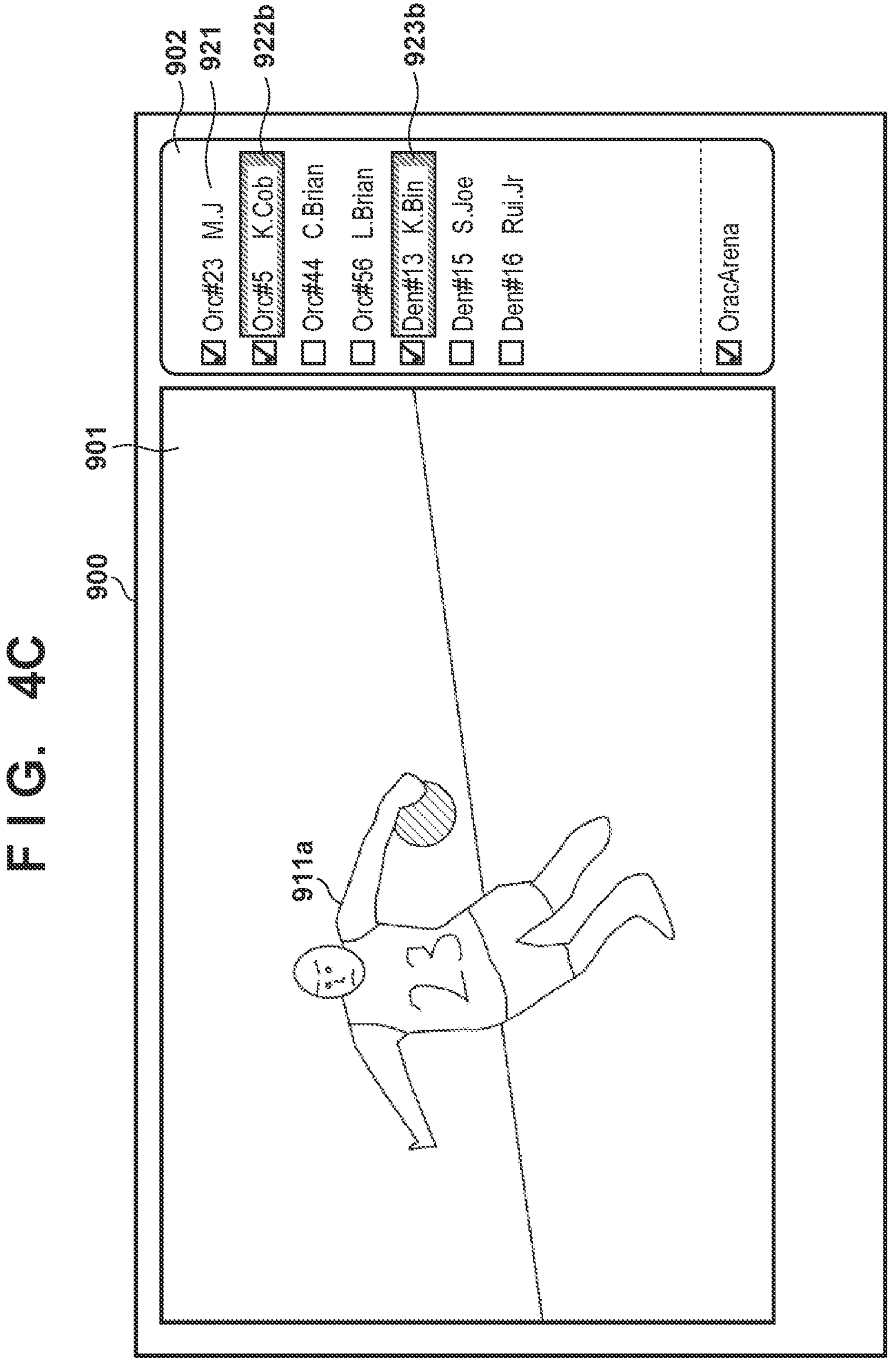

Next, a method of displaying digital contents will be described with reference to FIGS. 4A to 4C. The following examples will be described in relation to a case where a user who has purchased digital contents watches the contents. FIGS. 4A and 4B show examples of a screen that the screen display unit 40 displays on the display apparatus. As will be described below, the user, who is a viewer, can watch the contents to which they have a right. The user can view, for example, a virtual viewpoint video displayed on the display apparatus. Note that the following describes an example in which digital contents related to a basketball game are displayed.

A display screen 900 shown in FIG. 4A includes an image region 901 and a selection GUI 902. The image region 901 displays a virtual viewpoint image generated by the display system 4. In this example, the image region 901 displays a video of play of basketball. In the example of FIG. 4A, the image region 901 displays players 911*a*, 912*a*, and 913*a* who are objects, and a venue 914 which is a background.

The selection GUI 902 is used to select digital contents to be displayed in the image region 901. The selection GUI 902 displays a list of digital contents related to a scene. Specifically, the selection GUI 902 displays pieces of player information and venue information, which are pieces of metainformation of the digital contents. In FIG. 4A, the names of the teams to which the players belong, the uniform numbers of the players, and the names of the players are displayed as the pieces of player information. The players 911*a*, 912*a*, and 913*a* respectively correspond to pieces of player information 921, 922, and 923. Also, the venue 914 corresponds to a venue name 924.

As stated earlier, an NFT has been added to digital content related to each player. Then, the user obtains a right to digital content to which an NFT has been added by purchasing this NFT. This allows the user to watch the digital contents they own. In the example of FIG. 4A, the user has purchased the NFTs for the players 911*a*, 912*a*, and 913*a*. Therefore, in this example, the three players 911*a*, 912*a*, and 913*a* are displayed in the image region 901.

In this example, the virtual viewpoint image shows an object that has been placed in accordance with position information. Also, in a case where the user has a right to digital content, an object based on appearance information related to this content is displayed. That is to say, the object based on the appearance information is placed in a virtual space in accordance with position information. Specifically, the object obtained by appending a texture image based on texture data to a shape model based on shape data included in the content data is placed in the virtual space. Then, an image of such a virtual space in which the object has been placed from a virtual viewpoint is generated and displayed in the image region 901. In FIG. 4A, the players 911*a*, 912*a*, and 913*a*, who are objects inside the image region 901, are represented by shape models for which texture images have been rendered. Furthermore, each of the players 911*a*, 912*a*, and 913*a* is displayed at a position based on the position information included in the content data. In this way, the user can enjoy the scene of play by players by purchasing the NFTs for these players.

Also, in the selection GUI 902, checkboxes are displayed next to the pieces of metainformation of digital contents. The user can switch between the presence and absence of a check in a checkbox by making an input via a mouse or a touch on the screen. Furthermore, whether to display each digital content can be switched by using the checkboxes. In the example of FIG. 4A, the image region 901 displays the objects corresponding to the players 911*a*, 912*a*, and 913*a* and the venue 914 that have been designated using the checkboxes. Note that the selection GUI 902 may display digital contents owned by the user in distinction from digital contents that are not owned by the user. For example, pieces of player information related to players for whom the user has not purchased corresponding NFTs may be grayed out when displayed. With this configuration, the user can be notified of whether they own NFTs for the respective players.

FIG. 4B shows an exemplary case where the user has purchased the NFT for the player 911*a* but has not purchased the NFTs for the players 912*a* and 913*a*. In the selection GUI 902 of FIG. 4B, the pieces of player information 922 and 923 corresponding to the players 912*a* and 913*a* have been grayed out. Meanwhile, the checkboxes corresponding to the players 912*a* and 913*a* have been checked, too.

In the present embodiment, digital contents that are not owned by the user are also displayed. However, a display mode of an object corresponding to digital content is controlled in accordance with whether the user has a right to the digital content. For example, the content obtainment unit 42 can obtain content data of a first digital content related to a first object to which the user has a right, and content data of a second digital content related to a second object to which the user does not have a right. In this case, the control unit 44 verifies whether the user has rights to the first digital content and the second digital content. Then, the rendering unit 45 generates a virtual viewpoint image which shows the first object and the second object and in which the display mode of the first object is different from the display mode of the second object.

In an embodiment, in a case where the user does not have a right to digital content, an object corresponding to the digital content is displayed in a simplified manner in the virtual viewpoint image compared to a case where the user has a right to the digital content. For example, compared to the first object corresponding to the digital content owned by the user, the second object corresponding to the digital content that is not owned by the user is displayed in a simplified manner. In the present embodiment, a simplified model corresponding to the digital content that is not owned by the user is rendered, thereby realizing simplified display of the object corresponding to this digital content. Such a simplified model is equivalent to the object that is displayed in a simplified manner in the virtual viewpoint image.

In the example of FIG. 4B, simplified models 912*b* and 913*b* corresponding to the players 912*a* and 913*a* are displayed in the image region 901. Here, the simplified models 912*b* and 913*b* are respectively displayed at positions based on the pieces of position information included in the pieces of content data corresponding to the players 912*a* and 913*a*. Note that regardless of whether the NFTs have been purchased, digital contents corresponding to a player and a venue that have not been selected in the selection GUI 902 are not displayed in the image region 901.

In an embodiment, a simplified model has a preset shape. Also, the shape of the simplified model may not change in time series. Furthermore, the shape of the simplified model may be set independently of appearance information of an object. For example, the shape of the simplified model may be set independently of a three-dimensional shape of an object indicated by content data. In the example of FIG. 4B, the simplified models 912*b* and 913*b* have a shape made up of a circular cylinder and a sphere. Also, the shapes of the simplified models 912*b* and 913*b* do not change irrespective of the actions of the players 912*a* and 913*a*.

Meanwhile, in a case where the user does not have a right to digital content, an object is displayed in a simplified manner at a position based on position information in the virtual viewpoint image. In this case, a simplified model can be placed in a virtual space in accordance with the position information. In this way, the simplified model is also displayed at a position based on the position information of the object. That is to say, the position of the simplified model can change in time series in accordance with the position information of the object. In the example of FIG. 4B, the simplified models 912*b* and 913*b* move in accordance with the motions of the players 912*a* and 913*a*. Hereinafter, for the sake of explanation, a model based on appearance information, such as the shape model indicating the player 911*a*, will be referred to as a detailed model. The detailed model is, for example, a shape model for which a texture image has been rendered.

As described above, with simplified display of digital contents that are not owned by the user, the viewer can enjoy digital contents to a greater extent. For example, when the user is watching a scene of play by the player 911*a* representing digital content owned by the user, the user may wish that the detailed models of surrounding players were displayed. As one example, in a basketball game, a player on offense may capture while in contact with a player on defense. Also, the player on offense may skillfully move past the player on defense. In order to enjoy such matchup scenes to a greater extent, the user can purchase NFTs for other players. This allows the user to watch a scene of play where the detailed model of the player on defense is displayed.

At this time, displaying the digital contents that are not owned by the user as shown in FIG. 4B makes it easy for the user to specify the digital contents that the user wants to watch. In the above-described example, as the simplified models of players are displayed, the user can know the positions of other players, including the player on defense, on the display screen. Furthermore, the user can specify the player on defense who is in a matchup with the player on offense. This makes it easy for the user to specify the digital contents that the user wants to additionally own, compared to a case where the digital contents that are not owned by the user (players 912*a* and 913*a*) are not displayed as shown in FIG. 4C. In this way, the user's purchase of desired NFTs is facilitated.

Furthermore, the digital contents owned by the user become easily perceivable as a result of displaying the digital contents that are not owned by the user, compared to the case of FIG. 4C. For example, in the example of FIG. 4B, by using a simplified model to indicate the position of the player on defense, the fact that the player on offense is exhibiting magnificent movements to avoid the player on defense becomes easily perceivable.

Meanwhile, for detailed display of digital contents, the user needs to obtain rights to the digital contents. Therefore, the foregoing configuration allows the viewer to enjoy digital contents to a greater extent while protecting the rights of a content creator.

Note that the user's selection of digital contents to be displayed is not indispensable. For example, the selection GUI 902 may not be present on the display screen 900. Also, the selection GUI 902 may not include checkboxes. In this case, the objects (e.g., players) corresponding to all digital contents can be displayed in the image region 901. In this case, too, detailed models corresponding to the digital contents owned by the user and simplified models corresponding to the digital contents that are not owned by the user can be displayed. As described above, the user's action of switching between display and non-display of players, who are objects, is not indispensable.

Furthermore, in the foregoing examples, the venue 914 of the basketball game is used as the digital content of the background. In this way, the user can purchase the digital content of the background corresponding to an environment where the scene has been captured. Furthermore, the digital content of the background corresponding to the environment where the scene has been captured can be displayed. However, the background can be changed arbitrarily. For example, the user can purchase digital content related to a different venue as digital content of a background. Then, once the user has selected the background based on the digital content owned by the user, the image region 901 displays the background selected by the user. In this case, the selection GUI 902 may display a list of digital contents of backgrounds that have already been purchased by the user.

Such a configuration allows a scene (e.g., a game) in a venue different from a venue that was used in an actual scene to be enjoyed.

Note that no particular limitation is placed on the shape of a simplified model. A simplified model may be any object that has a lower resolution, reproducibility, or visibility than a detailed model. In this way, any object indicating the position of an object corresponding to digital content can be used as a simplified model.

For example, an image of an object that is displayed in a simplified manner may be generated in accordance with only a part of a data group composed of shape data and texture data. As one example, a simplified model may be based on shape data, but a texture image based on texture data may not be added to the simplified model. In this way, a simplified model may reflect appearance information of an object corresponding to digital content. In this case, the shape of the simplified model can change in time series.

Figure 5A:
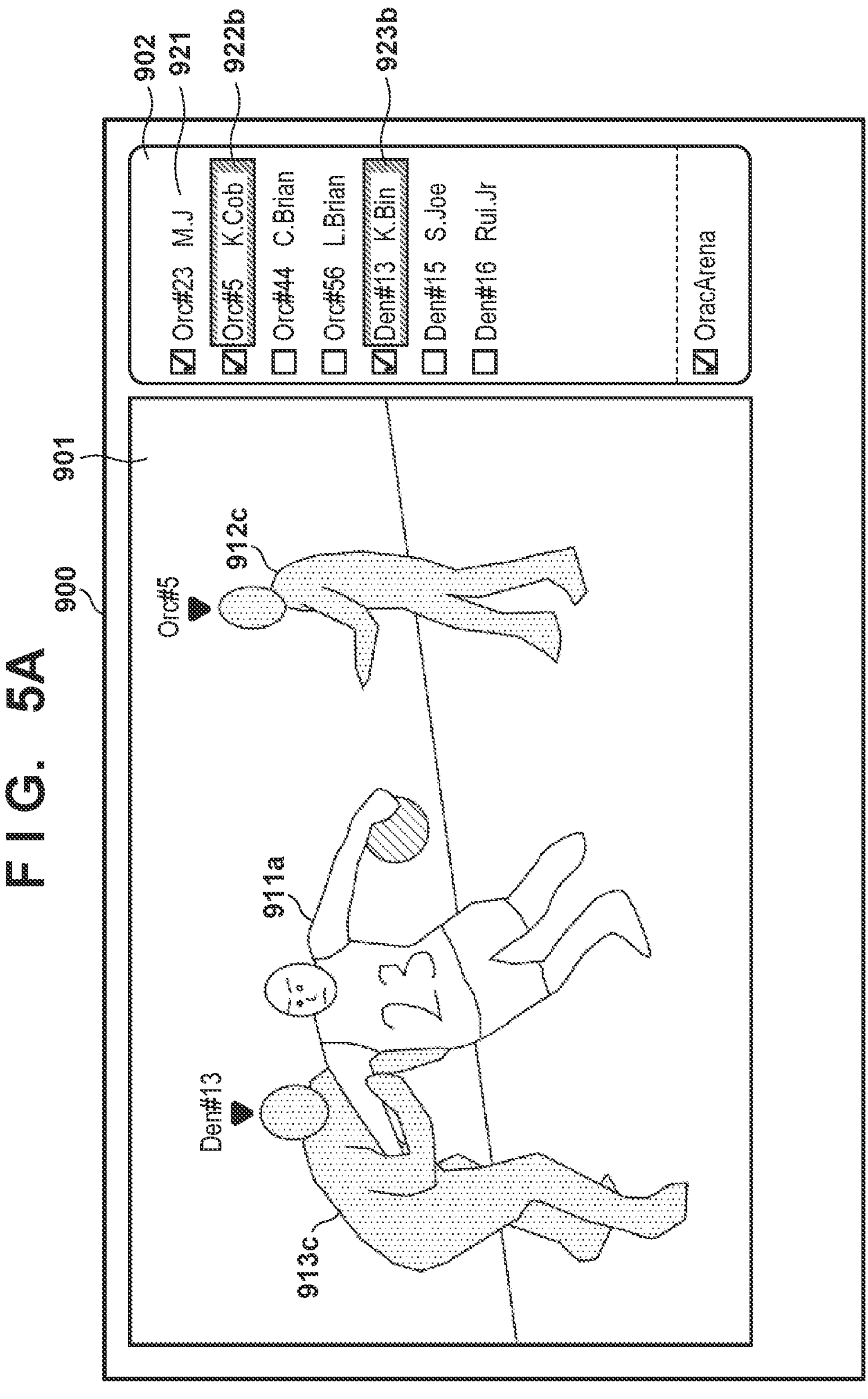
FIGS. 5A to 5C are schematic diagrams showing examples of a digital content display screen.

FIG. 5A shows an example of a screen for the foregoing case. In FIG. 5A, simplified models 912*c* and 913*c* correspond to the players 912*a* and 913*a*. The simplified models 912*c* and 913*c* indicate the shapes of the players 912*a* and 913*a*, but texture images of the players 912*a* and 913*a* have not been added thereto. FIG. 5A shows that, as a dotted pattern has been added to the simplified models 912*c* and 913*c*, the texture images of the players have not been rendered for the simplified models 912*c* and 913*c*. In this example, the simplified models have at least lower reproducibility of objects than detailed models.

Figure 5B:
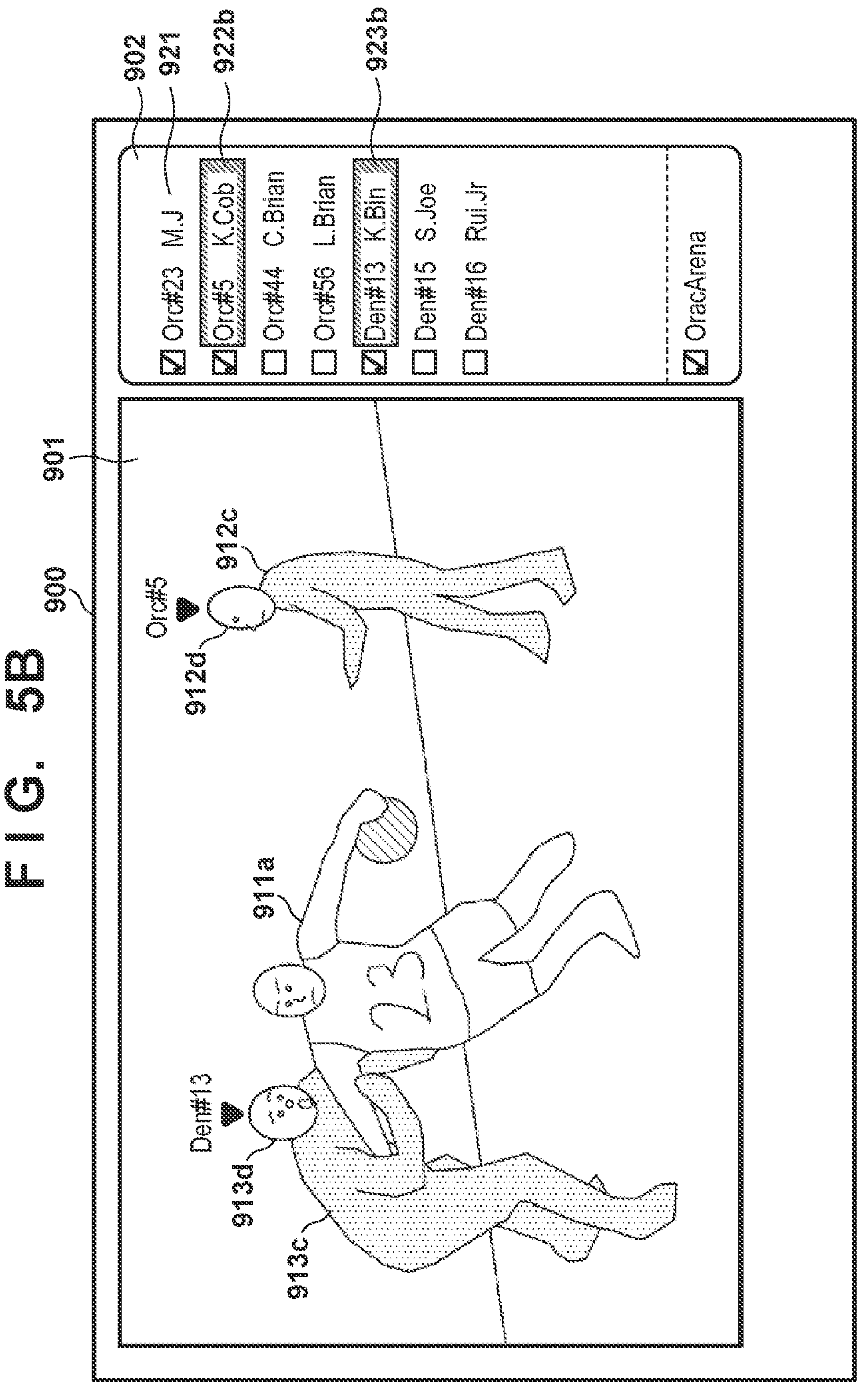

Also, FIG. 5B shows another example of a screen. Texture images of the players' faces have been rendered in face portions of the simplified models 912*c* and 913*c* shown in FIG. 5B. Meanwhile, texture images of the players' bodies have not been rendered in body portions of the simplified models 912*c* and 913*c*. According to this example of display, the players indicated by the simplified models can be specified more easily. In this example, the simplified models have at least lower reproducibility of objects than detailed models.

Furthermore, an image of an object that is displayed in a simplified manner may be generated based on shape data or texture data that has a lower resolution than shape data or texture data included in content data. For example, the resolution of a simplified model can be made lower than the resolution of a detailed model. Specifically, the resolution of shape data corresponding to digital content that is not owned by the user can be reduced. As one example, the number of meshes in a shape model indicated by shape data can be reduced. Also, point group information before the processing for creating meshes may be used as shape data. In addition, the resolution of texture data corresponding to digital content that is not owned by the user may be lowered. Specifically, a texture image with a lowered resolution may be rendered for a shape model indicated by shape data. A simplified model can be rendered using at least one of shape data and texture data that have a lowered resolution as described above.

As described above, one of the parameters of a simplified model may be simplified or degraded compared to that of a detailed model. Here, any parameter may be simplified or degraded. As another specific example, a simplified model may be a combination of a face of a player based on content data and a circular cylinder, rather than a combination of a sphere and a circular cylinder. Furthermore, the virtual viewpoint image may be generated so that the transparency of a simplified model is higher than that of a detailed model, in order to reduce the visibility of the simplified model. In this way, no specific limitation is placed on a method for simplified display of an object corresponding to digital content.

Note that information related to digital content may be displayed on the virtual viewpoint image in association with a simplified model (and a detailed model). For example, information related to digital content, such as metainformation of the digital content, may be displayed at a position that corresponds to a position of a simplified model (in the vicinity of the simplified model). In the example of FIG. 4B, the player names and uniform numbers corresponding to the simplified models 912*c* and 913*c* are displayed next to the simplified models. In this way, player information can be displayed in association with a simplified model indicating a player. Such a configuration makes it easier to specify digital content corresponding to a simplified model.

Furthermore, a simplified model may have a shape that has been set based on metainformation of digital content. That is to say, the shape or size of the simplified model can be changed in accordance with the metainformation of the digital content. For example, the size of a circular cylinder that composes a simplified model may be changed in accordance with a player's height or weight.

Operation Flow: Obtainment of Right to Digital Content

Processing in which a user obtains a right to digital content will be described with reference to a flowchart shown in FIG. 6A. In the following example, the user purchases an NFT added to the digital content.

In step S201, the user selects digital content to purchase. For example, the user can select the digital content to purchase from a list of contents that is displayed by the screen display unit 40 on the display apparatus.

Figures 7A, 7B:
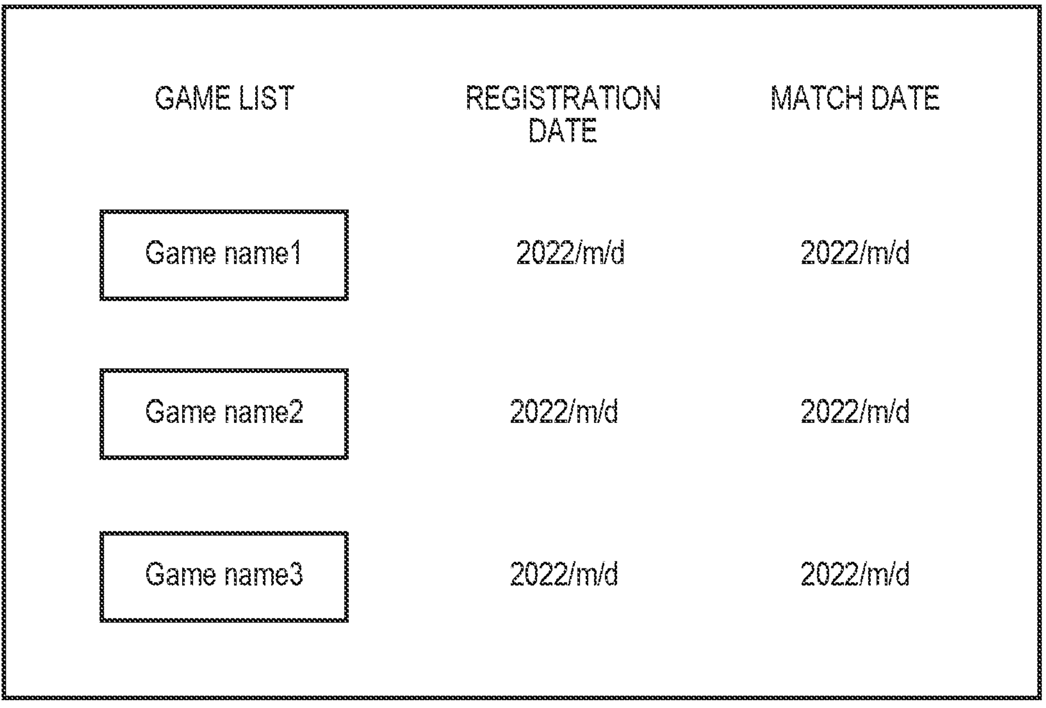
FIGS. 7A and 7B are schematic diagrams of a content selection screen according to a first embodiment.

In order to select the digital content, the user may first select a scene related to this digital content. For example, the user can select a scene from a list of scenes displayed by the screen display unit 40. FIG. 7A shows an example of a scene selection screen that is displayed by the screen display unit 40 on the display apparatus. In FIG. 7A, one scene corresponds to one game. The user selects a game that includes the content they want to purchase from among the games displayed on the scene selection screen. This scene selection screen displays information indicating the names of the registered games, the registration dates of the games, and the dates of matches.

Here, once the user has selected a scene, the screen display unit 40 displays a list of digital contents related to the scene. FIG. 7B shows an example of digital content selection screen that is displayed by the screen display unit 40 on the display apparatus. A list of digital contents related to the selected game may be displayed as shown in FIG. 7B. In FIG. 7B, pieces of metainformation (e.g., the uniform numbers and names of players) of the digital contents related to the selected game are displayed. In FIG. 7B, these pieces of metainformation are grouped on a per-team basis when displayed. Also, in FIG. 7B, the remaining number of NFTs and the total number of NFTs are displayed for each digital content. Furthermore, metainformation (e.g., a venue name), the remaining number of NFTs, and the total number of NFTs of digital content related to a background object are displayed in a lower part of the screen shown in FIG. 7B.

The total number of NFTs denotes a total count of NFTs added to digital content. Also, the remaining number of NFTs denotes the number of NFTs that have not been purchased yet out of the total number of NFTs. The total number of NFTs can be determined by a digital content creator. In a case where the remaining number of NFTs for a certain digital content is 0, the user cannot buy an NFT for this digital content.

The user can select digital content they want to purchase (e.g., digital contents of a player and a venue) and determine to purchase the same using a GUI. At this time, the control unit 44 transmits a purchase request and purchase information to the request transmission unit 41. The purchase information can include an ID (e.g., a player ID or a venue ID) of the digital content to be purchased.

In step S202, the request transmission unit 41 transmits the purchase request and the purchase information received from the control unit 44 to the request reception unit 31. The request transmission unit 41 further transmits a user ID of the user who is purchasing the digital content to the request reception unit 31.

In step S203, the request reception unit 31 obtains user information corresponding to the user ID from the user management unit 30. Then, the request reception unit 31 transmits the purchase information and the user information to the data obtainment unit 33.

In step S204, the data obtainment unit 33 transmits the purchase information and the user information to the database system 1.

In step S205, the database system 1 executes processing for associating the digital content with the user who has purchased this digital content. In this example, the database system 1 obtains the NFTs added to the digital content based on the ID of the digital content included in the purchase information. Then, the database system 1 rewrites owner information added to the NFTs using the information of the user who has purchased the digital content. Furthermore, the database system 1 re-registers the NFTs that have been rewritten with the blockchain system 2.

In this way, once the user has purchased the digital content, the user's right to the digital content is registered.

Figure 5C:
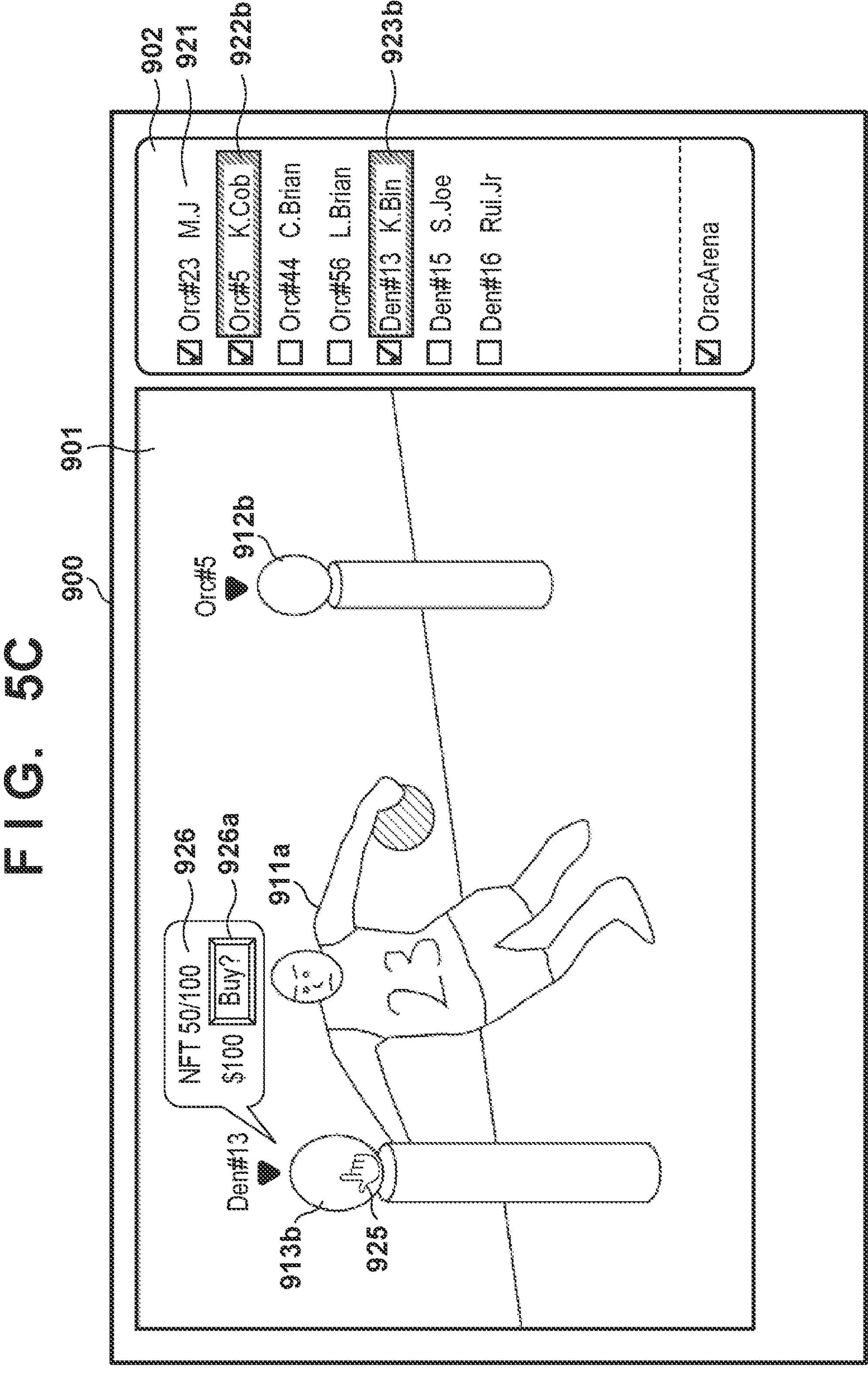

Note that a method of purchasing digital content is not limited to the above-described method. FIG. 5C shows an example of a user interface that is used to purchase digital content. The image region 901 additionally displays a cursor 925 and a popup display 926. The user can move the cursor 925 to the simplified model 913*b* by operating the operation unit, which is a mouse or the like. Once the user has selected the simplified model 913*b* using the cursor 925 in the foregoing manner, the popup display 926 is displayed. The popup display 926 displays the remaining number of NFTs, the total number of NFTs, and the price of an NFT related to the player corresponding to the selected simplified model 913*b*. Furthermore, the popup display 926 displays a purchase determination button 926*a*. Here, if the user selects the purchase determination button 926*a* using the cursor 925, the user can purchase digital content of the player corresponding to the simplified model 913*b*.

As shown in FIG. 5C, the virtual viewpoint image may display a user interface component (e.g., the purchase determination button 926*a*) for obtaining a right to digital content in correspondence with an object that has been displayed in a simplified manner. Such a user interface component may be displayed in response to the selection of the object that has been displayed in a simplified manner.

Operation Flow: Display of Digital Contents

Processing in which the display system 4 displays digital contents will be described with reference to a flowchart shown in FIG. 6B.

In step S206, the request transmission unit 41 transmits an obtainment request for digital contents to be displayed to the request reception unit 31. A method of selecting the digital contents to be displayed is not limited in particular. For example, the processing shown in FIG. 6B may be executed following the processing shown in FIG. 6A. In this case, the request transmission unit 41 may transmit an obtainment request for digital contents that have been purchased in the processing shown in FIG. 6A. Also, the request transmission unit 41 may transmit an obtainment request for all digital contents related to the scene (e.g., game) selected in step S201. Furthermore, the digital contents to be displayed may be selected using the selection GUI 902 of FIG. 4A. For example, in a case where a new digital content has been selected as display target after step S209, the request transmission unit 41 may transmit an obtainment request for this new digital content to the request reception unit 31. This obtainment request for the digital content can include information that identifies the digital content (e.g., an ID of the digital content).

In step S207, the data obtainment unit 33 receives the obtainment request for the digital contents from the request reception unit 31. Then, the data obtainment unit 33 obtains pieces of content data of the digital contents based on the obtainment request from the database system 1. As stated earlier, these pieces of content data include pieces of appearance information and position information of objects corresponding to the digital contents. Then, the data obtainment unit 33 transmits the pieces of content data to the distribution unit 34. Furthermore, the distribution unit 34 transmits these pieces of data to the content obtainment unit 42 of the display system 4.

In step S208, the control unit 44 verifies the user's rights to the digital content. In this example, the control unit 44 can obtain the pieces of content data from the content obtainment unit 42. Also, the control unit 44 can obtain user information from the user information obtainment unit 43. This user information is information that identifies the user who is using the display system 4. Then, the control unit 44 cross-references owner information of the NFTs added to the obtained digital contents with the user information obtained from the user information obtainment unit 43. The control unit 44 can obtain the owner information of the NFTs by referring to a blockchain managed by the blockchain system 2. If the owner information of the NFTs matches the user information, the control unit 44 determines that the user has rights to the digital contents. If the owner information of the NFTs is different from the user information, the control unit 44 determines that the user does not have rights to the digital contents.

As has already been described, the rendering unit 45 can generate a virtual viewpoint image based on pieces of content data of two or more digital contents. Especially, the rendering unit 45 can generate a virtual viewpoint image based on pieces of content data of one or more digital contents to be displayed that have been selected by the user from among a plurality of digital contents. Therefore, in step S207, the content obtainment unit 42 can obtain pieces of content data related to a plurality of digital contents. In this case, the control unit 44 can verify whether the user has a right to each of the two or more digital contents.

In step S209, the control unit 44 controls the operations of the rendering unit 45 to generate a virtual viewpoint image in accordance with the result of verification of the user's rights to the digital contents. The control method is as described with reference to FIG. 4A to FIG. 5C.

For example, the control unit 44 can transmit, to the rendering unit 45, pieces of appearance information and position information related to the digital contents (e.g., players or backgrounds) that have been determined to be owned by the user in step S208. In this case, the rendering unit 45 can render objects (i.e., detailed models) corresponding to the digital contents with use of pieces of shape data, texture data, and position information. Meanwhile, the control unit 44 can transmit, to the rendering unit 45, pieces of position information related to the digital contents (e.g., players or backgrounds) that have not been determined to be owned by the user in step S208. At this time, pieces of appearance information related to the digital contents may not be transmitted to the rendering unit 45. In this case, the rendering unit 45 can render simplified models (e.g., objects having a preset shape) with use of the pieces of position information. The rendering unit 45 can display the virtual viewpoint image including these rendered objects in the image region 901 of the display screen 900. Note that, in this example, an object corresponding to digital content that has not been selected as a display target is not displayed in the image region 901.

Note that in a case where the digital contents selected as display targets or the digital contents related to the selected scene include none of the digital contents owned by the user, the control unit 44 may provide a notification to the user. In a case where the digital contents selected as display targets or the digital contents having a specific attribute related to the selected scene include none of the digital contents owned by the user, a notification may be provided to the user. For example, the control unit 44 can determine that none of the digital contents which have been determined to be owned by the user in step S208 and which correspond to players exists. In this case, the control unit 44 can cause the display screen 900 to include a warning display indicating that the user has not purchased any of the NFTs related to players.

In step S210, the rendering unit 45 generates a virtual viewpoint image under control of the control unit 44. Meanwhile, the rendering unit 45 can generate a virtual viewpoint image of objects that have been placed in a virtual space in accordance with pieces of position information, as has already been described. Meanwhile, in the virtual viewpoint image generated by the rendering unit 45, objects are displayed in a simplified manner in a case where the user does not have rights to digital contents, compared to a case where the user has rights to the digital contents. In this way, the rendering unit 45 can generate the display screen 900 in which the virtual viewpoint image is included in the image region 901. The image generated by the rendering unit 45 is transmitted to the screen display unit 40. Then, the screen display unit 40 displays this image on the display apparatus.

With the above method, the display apparatus displays a virtual viewpoint image including digital contents. Note that a virtual viewpoint of the virtual viewpoint image may be set in advance, or may be set by the user. For example, the virtual viewpoint can be changed in step S211.

In step S211, the control unit 44 accepts a user operation for changing a virtual viewpoint. For example, the user can input virtual viewpoint information indicating the position and orientation of the virtual viewpoint by operating the operation unit 216, which is a joystick or the like. The control unit 44 transmits the virtual viewpoint information that has been input in the foregoing manner to the rendering unit 45. Thereafter, processing returns to step S209. In step S209, the rendering unit 45 generates a virtual viewpoint image based on the virtual viewpoint information set in step S211. As a result of repeating the processing of steps S209 to S211, the viewer can watch a virtual viewpoint image corresponding to virtual viewpoint information. Note that, as has already been described, the rendering unit 45 may generate a virtual viewpoint video. In this case, the rendering unit 45 can generate virtual viewpoint images that correspond to different times by repeating the processing of steps S209 to S211. At this time, the positions of both of detailed models and simplified models in a virtual space can be changed in accordance with pieces of position information of each time, which are indicated by pieces of content data.

The above-described embodiment allows the viewer to enjoy digital contents to a greater extent while protecting the rights of a content creator.

Other Configurations

Thus far, a description of a case that handles digital contents related to players and a background of a game has been mainly provided. However, no particular limitation is placed on the types of digital contents. The present embodiment is applicable to contents based on various video techniques. For example, the method of the present embodiment is applicable to a video technique that enables display (or non-display) on a per-object basis. In this case, too, when a user does not have a right to a content, an object corresponding to this content is displayed in a simplified manner.

Furthermore, in the above-described embodiment, a user's right to digital content is managed by adding an NFT(s) to the digital content. However, a method of managing a user's right to digital content is not limited to this method. That is to say, it is not required to use the blockchain technology. For example, a user's right to digital content may be managed by a management system operated by a content creator or a content provider. As one example, the database system 1 may manage a user's right to digital content.

Furthermore, as has been described with reference to FIG. 4A to FIG. 5C, it is possible to adopt various display modes of objects that are displayed in a simplified manner. Here, a user may be allowed to select a display mode of an object. For example, an object corresponding to digital content that is not owned by the user may be displayed in a virtual viewpoint image in accordance with a display mode selected by the user. A display mode for each object may be selectable via, for example, the selection GUI 902. In this case, the selection GUI 902 may include a user interface component, such as a checkbox, for selecting a display mode.

In the present embodiment, the display system 4 verifies whether a user has a right to digital content. Then, the display system 4 controls simplified display of an object based on content data. However, the verification of whether a user has a right to digital content may be performed by another system such as the provision system 3 and the database system 1. In this case, the control unit 44 can verify whether a user has a right to digital content by querying such another system about whether the user has the right.

Furthermore, in an embodiment, distribution of a content data can be controlled in accordance with a result of verification of whether a user has a right to digital content. For example, the provision system 3, which is a distribution apparatus or an information processing apparatus according to an embodiment, can realize such processing. That is to say, the provision system 3 can control transmission of content data based on a user's right to digital content.

For example, the request reception unit 31 can verify whether a user has a right to digital content through processing similar to that executed by the screen display unit 40. Also, the distribution unit 34 can transmit content data of the digital content to an image processing apparatus (e.g., the display system 4) that generates a virtual viewpoint image. Here, the distribution unit 34 can transmit information indicating a display mode of an object corresponding to the digital content to the image processing apparatus in accordance with whether the user has a right to the digital content. Such a configuration enables the image processing apparatus to generate a virtual viewpoint image so that the display mode of a first object differs from the display mode of a second object.

For example, the distribution unit 34 may change the content data to be transmitted to the image processing apparatus in accordance with whether the user has a right to the digital content. In one example, the distribution unit 34 can control whether to transmit appearance information of the object corresponding to the digital content to the image processing apparatus in accordance with whether the user has a right to the digital content. In such an example, the transmitted content data or appearance information is equivalent to the information indicating the display mode of the object. For example, in a case where the user has a right to the digital content, the distribution unit 34 transmits the appearance information of the object corresponding to this digital content to the image processing apparatus. On the other hand, in a case where the user does not have a right to the digital content, the distribution unit 34 does not transmit the appearance information of the object corresponding to this digital content to the image processing apparatus. In either case, the distribution unit 34 can transmit position information of the object corresponding to this digital content to the image processing apparatus. In this case, the display system 4 can realize simplified display of digital contents that are not owned by the user as shown in FIG. 4B.

Furthermore, the distribution unit 34 can control the quality of the appearance information of the object transmitted to the image processing apparatus in accordance with whether the user has a right to the digital content. For example, in a case where the user has a right to the digital content, the distribution unit 34 transmits appearance information indicating a detailed model of the object corresponding to this digital content to the image processing apparatus. On the other hand, in a case where the user does not have a right to the digital content, the distribution unit 34 transmits appearance information indicating a simplified model of the object corresponding to this digital content to the image processing apparatus. Examples of the simplified model are as already described above. In either case, the distribution unit 34 can transmit position information of the object corresponding to this digital content to the image processing apparatus. In this case, too, the display system 4 can realize simplified display of digital contents that are not owned by the user as shown in FIGS. 5A and 5B.

As another example, the distribution unit 34 may transmit control information for controlling the operations performed by the rendering unit 45 of the display system 4 as information indicating a display mode of the object corresponding to the digital content to the display system 4. In this case, similarly to the control unit 44 that has already been described, the distribution unit 34 can control the operations performed by the rendering unit 45 to generate a virtual viewpoint image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-051990, filed Mar. 28, 2023, which is hereby incorporated by reference herein in its entirety.

What is claimed is:

1. An information processing apparatus comprising one or more memories storing instructions and one or more processors that execute the instructions to:

obtain content data of a first digital content related to a first object to which a user has a right, and content data of one or more second digital contents related to one or more second objects to which the user does not have a right, wherein the content data of the first digital content and the one or more second digital contents includes appearance information and position information of the first object and the one or more second objects that change with time and that are generated based on a plurality of images of a subject captured by a plurality of capturing apparatuses;

verify whether the user has rights to the first digital content and the one or more second digital contents; and generate a virtual viewpoint image of a virtual space from a changeable virtual viewpoint, wherein the virtual viewpoint image includes the first object and the one or more second objects, wherein the first object is displayed in the virtual viewpoint image in a first display mode in accordance with the appearance information of the content data of the first digital content at a position indicated by the position information of the content data of the first digital content, and each of the one or more second objects is displayed in the virtual viewpoint image in a second display mode by placing, in the virtual space, a model having a predetermined shape unrelated to a three-dimensional shape indicated by a corresponding one of the one or more second digital contents at a respective position indicated by the position information of the content data of the corresponding one of the one or more second digital contents, without using the appearance information of the one or more second digital contents, wherein the first display mode differs from the second display mode.

2. The information processing apparatus according to claim 1, wherein in the virtual viewpoint image, the second object related to the second digital content to which the user does not have the right is displayed in a simplified manner compared to the first object related to the first digital content to which the user has the right.

3. The information processing apparatus according to claim 1, wherein in the virtual viewpoint image, the second object related to the second digital content to which the user does not have the right has a preset shape, or a shape that has been set independently of a three-dimensional shape of the second object indicated by the content data of the second digital content.

4. The information processing apparatus according to claim 1, wherein the content data of the second digital content includes shape data of the second object and texture data of the second object.

5. The information processing apparatus according to claim 4, wherein the shape data of the second object is data indicating a three-dimensional shape of the second object, or a group of foreground images that have been extracted respectively from a plurality of captured images obtained by capturing a subject corresponding to the second object from a plurality of directions.

6. The information processing apparatus according to claim 1, wherein the virtual viewpoint image includes, in association with the second object related to the second digital content to which the user does not have the right, metainformation of the second digital content.

7. The information processing apparatus according to claim 1, wherein the virtual viewpoint image includes, in association with the second object related to the second digital content to which the user does not have the right, a user interface component for obtaining a right to the second digital content.

8. The information processing apparatus according to claim 1, wherein the one or more processors execute the instructions to verify whether the user has a right to the first digital content and the one or more second digital contents using a blockchain technology.

9. The information processing apparatus according to claim 1, wherein the one or more processors execute the instructions to verify whether the user has a right to the first digital content and the one or more second digital contents based on a non-fungible token (NFT) added to the first digital content and the second digital content.

10. An information processing apparatus comprising one or more memories storing instructions and one or more processors that execute the instructions to:

verify whether a user has a right to digital content;

transmit content data of the digital content to an image processing apparatus that generates a virtual viewpoint image of a virtual space from a changeable virtual viewpoint, wherein the content data includes appearance information and position information of an object that change with time and that are generated based on a plurality of images of a subject captured by a plurality of capturing apparatuses; and transmit information indicating a display mode of the object corresponding to the digital content to the image processing apparatus in accordance with whether the user has a right to the digital content, wherein the content data includes content data of a first digital content related to a first object to which a user has a right, and content data of a second digital content related to a second object to which the user does not have a right, wherein the first object is displayed in the virtual viewpoint image in a first display mode in accordance with the appearance information of the content data of the first digital content at a position indicated by the position information of the content data of the first digital content, and the second object is displayed in the virtual viewpoint image in a second display mode by placing, in the virtual space, a model having a predetermined shape unrelated to a three-dimensional shape indicated by the second digital content at a position indicated by the position information of the content data of the second digital content, without using the appearance information of the second digital content, wherein in a case where the content data includes a plurality of second digital contents related to respective second objects, the model having the predetermined shape are placed for the respective second objects, wherein the first display mode differs from the second display mode.

11. An information processing method, comprising:

obtaining content data of a first digital content related to a first object to which a user has a right, and content data of one or more second digital contents related to one or more second objects to which the user does not have a right, wherein the content data of the first digital content and the one or more second digital contents includes appearance information and position information of the first object and the second object that change with time and that are generated based on a plurality of images of a subject captured by a plurality of capturing apparatuses;

verifying whether the user has rights to the first digital content and the one or more second digital contents; and generating a virtual viewpoint image of a virtual space from a changeable virtual viewpoint, wherein the virtual viewpoint image includes the first object and the one or more second objects, wherein the first object is displayed in the virtual viewpoint image in a first display mode in accordance with the appearance information of the content data of the first digital content at a position indicated by the position information of the content data of the first digital content, and each of the one or more second objects is displayed in the virtual viewpoint image in a second display mode by placing, in the virtual space, a model having a predetermined shape unrelated to a three-dimensional shape indicated by a corresponding one of the one or more second digital contents at a respective position indicated by the position information of the content data of the corresponding one of the one or more second digital contents, without using the appearance information of the one or more second digital contents, wherein the first display mode differs from the second display mode.

12. An information processing method comprising:

verifying whether a user has a right to digital content;

transmitting content data of the digital content to an image processing apparatus that generates a virtual viewpoint image of a virtual space from a changeable virtual viewpoint, wherein the content data includes appearance information and position information of an object that change with time and that are generated based on a plurality of images of a subject captured by a plurality of capturing apparatuses; and transmitting information indicating a display mode of the object corresponding to the digital content to the image processing apparatus in accordance with whether the user has a right to the digital content, wherein the content data includes content data of a first digital content related to a first object to which a user has a right, and content data of a second digital content related to a second object to which the user does not have a right, wherein the first object is displayed in the virtual viewpoint image in a first display mode in accordance with the appearance information of the content data of the first digital content at a position indicated by the position information of the content data of the first digital content, and the second object is displayed in the virtual viewpoint image in a second display mode by placing, in the virtual space, a model having a predetermined shape unrelated to a three-dimensional shape indicated by the second digital content at a position indicated by the position information of the content data of the second digital content, without using the appearance information of the second digital content, wherein in a case where the content data includes a plurality of second digital contents related to respective second objects, the model having the predetermined shape are placed for the respective second objects, wherein the first display mode differs from the second display mode.

13. A non-transitory computer-readable medium storing a program executable by a computer to perform a method comprising:

obtaining content data of a first digital content related to a first object to which a user has a right, and content data of one or more second digital contents related to one or more second objects to which the user does not have a right, wherein the content data of the first digital content and the one or more second digital contents includes appearance information and position information of the first object and the second object that change with time and that are generated based on a plurality of images of a subject captured by a plurality of capturing apparatuses;

verifying whether the user has rights to the first digital content and the one or more second digital contents; and generating a virtual viewpoint image of a virtual space from a changeable virtual viewpoint, wherein the virtual viewpoint image includes the first object and the second object, wherein the first object is displayed in the virtual viewpoint image in a first display mode in accordance with the appearance information of the content data of the first digital content at a position indicated by the position information of the content data of the first digital content, and each of the one or more second objects is displayed in the virtual viewpoint image in a second display mode by placing, in the virtual space, a model having a predetermined shape unrelated to a three-dimensional shape indicated by a corresponding one of the one or more second digital contents at a respective position indicated by the position information of the content data of the corresponding one of the one or more second digital contents, without using the appearance information of the one or more second digital contents, wherein the first display mode differs from the second display mode.

* * * * *